(12) United States Patent
Earley, Jr.

(10) Patent No.: US 11,558,077 B2
(45) Date of Patent: Jan. 17, 2023

(54) CELLPHONE ASSEMBLY

(71) Applicant: Larry Earley, Jr., Palm Bay, FL (US)

(72) Inventor: Larry Earley, Jr., Palm Bay, FL (US)

(*) Notice: Subject to any disclaimer, the term of this patent is extended or adjusted under 35 U.S.C. 154(b) by 0 days.

(21) Appl. No.: 17/870,348

(22) Filed: Jul. 21, 2022

(65) Prior Publication Data

US 2022/0360290 A1 Nov. 10, 2022

(51) Int. Cl.
*H04B 1/3888* (2015.01)
*A45C 11/04* (2006.01)

(52) U.S. Cl.
CPC .......... *H04B 1/3888* (2013.01); *A45C 11/04* (2013.01)

(58) Field of Classification Search
CPC .............................. H04B 1/3888; A45C 11/04
See application file for complete search history.

(56) References Cited

U.S. PATENT DOCUMENTS

| | | | |
|---|---|---|---|
| 8,989,826 B1 | 3/2015 | Connolly | |
| D726,413 S | 4/2015 | Shalon | |
| 9,949,541 B2 | 4/2018 | Kantor | |
| 10,025,113 B2 | 7/2018 | Shalon | |
| 10,993,515 B1* | 5/2021 | Kim | H02J 7/0044 |
| 2014/0360898 A1* | 12/2014 | Kantor | A45F 5/02 |
| | | | 206/216 |
| 2018/0090958 A1 | 3/2018 | Steger | |
| 2020/0271960 A1 | 8/2020 | Baek | |
| 2021/0088810 A1 | 3/2021 | Adams | |
| 2021/0364820 A1* | 11/2021 | Perry | G02C 5/143 |
| 2022/0231523 A1* | 7/2022 | Bristol | A45C 15/00 |

* cited by examiner

*Primary Examiner* — Yuwen Pan
*Assistant Examiner* — Fatuma G Sherif
(74) *Attorney, Agent, or Firm* — Bullock Law; Stephen Bullock (57) ABSTRACT

Embodiments of the present invention are related to a cellphone assembly with a first half including a glasses arm storage compartment with rotatable outer casing, a second half including a glasses body storage compartment with rotatable outer casing, and modular glasses including detachable glasses arms, and a detachable glasses body. The cellphone assembly includes a dual screened cellular phone positioned on an opposing side of the glasses arm storage compartment and the glasses body storage compartment. The first half and second half outer casings are rotatable along a respective first cover hinge and second cover hinge and the first half and the second half are rotatably engaged along a main hinge.

17 Claims, 8 Drawing Sheets

CELLPHONE ASSEMBLY

FIELD OF THE INVENTION

The present invention relates to systems and methods for carrying a cellphone and glasses. In particular, the present invention relates to a cellphone assembly.

BACKGROUND

The future of mobile communications includes wearable electronic devices that provide information while interacting with the physical world. Currently, smartphone users distract themselves by continuously monitoring their phone. Smart-glasses assist with alleviating the disconnect by allowing users to keep their heads up and interact with the world, while remaining connected to notifications from their mobile device via a heads-up-display (HUD).

There exists a need in the art for smart-glasses that not only pair with a cellphone, but that are easily transported therewith. This alleviates the need to continuously wear the smart-glasses and assists with addressing security concerns associated with remote data transfer. By decreasing the distance needed to transfer certain types of data between the smart-glasses and cellphone, the risk of that transferred data being intercepted is decreased as well. Furthermore, because both devices are designed for continued use, an efficient means of transporting battery power and an efficient means of chargeability is needed. Therefore, there exists a need in the art for a cellphone assembly and associated methods as described herein.

SUMMARY OF THE INVENTION

Embodiments of the present invention are related to a cellphone assembly with a first half including a glasses arm storage compartment with rotatable outer casing, a second half including a glasses body storage compartment with rotatable outer casing, and modular glasses including detachable glasses arms, and a detachable glasses body. The cellphone assembly includes a dual screened cellular phone positioned on an opposing side of the glasses arm storage compartment and the glasses body storage compartment. The first half and second half outer casings are rotatable along a respective first cover hinge and second cover hinge and the first half and the second half are rotatably engaged along a main hinge.

The modular glasses may be smart glasses structured to be rechargeable by the first and second half. In some embodiments, the modular glasses may be stored on an exterior of the assembly and the dual screened cellphone may comprise the interior of the assembly. In other embodiments, the modular glasses may be stored on an interior of the assembly and the dual screened cellphone may comprise the exterior of the assembly. Furthermore, the glasses arms and glasses body may be removably secured within their respective first and second halves via respective glasses arm impressions and glasses body impression. Additionally, the glasses arms and glasses body may be further secured to the first and second halves via magnets positioned within the respective glasses arm impressions and glasses body impression.

The modular glasses may be structured to removably assemble via end attractors on the glasses arms removably engaging to body attractors on the glasses body. The end attractors and the body attractors may further include data ports structured to exchange data between at least one of the glasses arms, glasses body, dual screened cellphone and the first half and second half. Additionally, the first half may further include a wireless charging receiver structured to charge a first battery within the first half.

Another embodiment of the invention may have a first half including a glasses arm storage compartment with separate glasses arm impressions including medial attractors and a rotatable outer casing. A second half may include a glasses body storage compartment with a separate glasses body impression including body attractors, and a rotatable outer casing. The assembly may include modular glasses with detachable glasses arms including end attractors and a detachable glasses body including body attractors. It may also include a dual screened cellular phone positioned on an opposing side of the glasses arm storage compartment and the glasses body storage compartment. The detachable glasses arms may be structured to removably engage the glasses body via the end attractors engaging the body attractors. The detachable glasses arms may be structured to removably engage the glasses arm impressions via the medial attractors. The detachable glasses body may be structured to removably engage the glasses body impression via body attractors positioned on the glasses body connecting to body attractors positioned within the glasses body impression. The first half and second half outer casings may be rotatable along a respective first cover hinge and second cover hinge. Also, the first half and the second half may be rotatably engaged along a main hinge.

In this embodiment, the modular glasses may be smart glasses including batteries within at least one of the glasses arm and glasses body that are structured to be rechargeable by the first and second half. At least one of the wireless receiver and USB port may be structured to provide a means to recharge at least one of the glasses arms, glasses body, first half, second half, and dual screened cellular phone. Additionally, at least one of the medial attractor, body attractor, and end attractors may further include a data port and charging port structured to exchange at least one of data and charge between attracted components.

In this embodiment, the cellphone assembly may further including at least one data bus within the first half and second half structured to relay data between at least one of the glasses arms, glasses body, dual screened cellular phone, the first half and second half. In some embodiments, the modular glasses may be stored on an exterior of the assembly and the dual screened cellphone may comprise the interior of the assembly. In other embodiments, the modular glasses may be stored on an interior of the assembly and the dual screened cellphone may comprise the exterior of the assembly.

Another embodiment of the invention may be a cellphone assembly with a first half including a glasses arm storage compartment with separate glasses arm impressions including medial attractors, a first half cellphone battery, a wireless charging receiver connected to the first half cellphone battery, case end attractors, a circuit board, a data bus, a USB port, a load sharing battery, and a rotatable outer casing. A second half may include a glasses body storage compartment with a separate glasses body impression comprising body attractors, a second half battery, a load sharing battery, a data bus, a circuit board, a rotatable outer casing, and modular glasses comprising detachable glasses arms with end attractors including a respective arm battery within each glasses arm, a respective arm circuit board within each glasses arm, and a detachable glasses body including body attractors. The detachable glasses body may include a glasses body battery within an upper longitudinal segment of the body frame and a glasses body circuit board within an upper longitudinal segment of the body frame. The assembly may also include a dual screened cellular phone positioned on an opposing side of the glasses arm storage compartment and the glasses body storage compartment.

The detachable glasses arms may be structured to removably engage the glasses body via the end attractors joining the body attractors. The detachable glasses arms may be structured to removably engage the glasses arm impressions via the medial attractors. Furthermore, the detachable glasses body may be structured to removably engage the glasses body impression via body attractors positioned on the glasses body connecting to body attractors positioned within the glasses body impression. Also, the first half and second half outer casings may be rotatable along a respective first cover hinge and second cover hinge and the first half and the second half may be rotatably engaged along the main hinge.

In this embodiment, the first half battery may be structured to supplement charge to the glasses arms and the second half battery may be structured to supplement charge to the glasses body. Furthermore, the first half battery, second half battery, and load sharing battery may be structured to supply charge to at least one of the glasses arms, glasses body, and dual screened cellphone.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
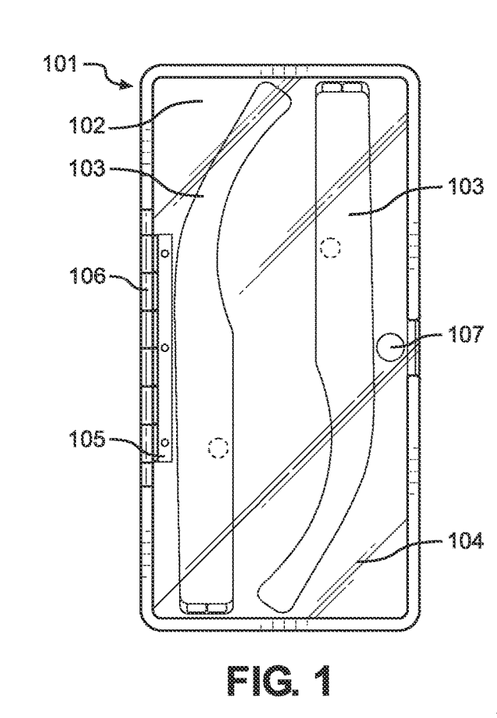
FIG. 1 is a perspective view of a first half of the cellphone assembly according to an embodiment of the invention.

Referring now to FIG. 1, a first half 101 of the cellphone assembly, hereinafter the apparatus 100, is shown. As depicted, the apparatus 100 may include a first half 101 with an outer casing 104 enclosing glasses arm storage 102 structured to hold the arms 103 of modularized glasses. The outer casing 104 may be rotatably attached to the first half 101 via first cover hinge 105. Furthermore, the first half 101 may be rotatably attached to a second half 201 via main hinge 106. Additionally, a closing magnet 107 may facilitate the first half 101 magnetically closing with the second half 201.

Figure 2:
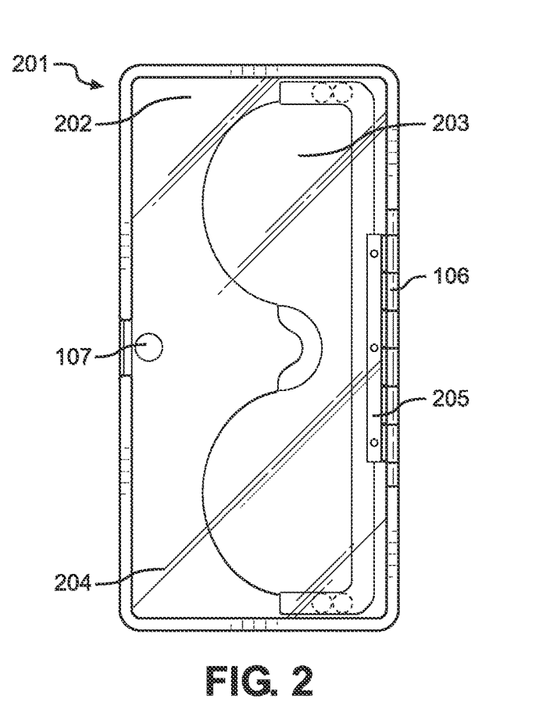
FIG. 2 is a perspective view of a second half of the cellphone assembly according to an embodiment of the invention.

FIG. 2 illustrates a second half 201 of the apparatus 100 with an outer casing 204 enclosing glasses body storage 202 to hold the body 203 of modularized glasses. The outer casing 204 may be rotatably attached to the second half 201 via second cover hinge 205. Furthermore, the second half 201 may be rotatably attached to the first half 201 via the main hinge 106.

Figure 3:
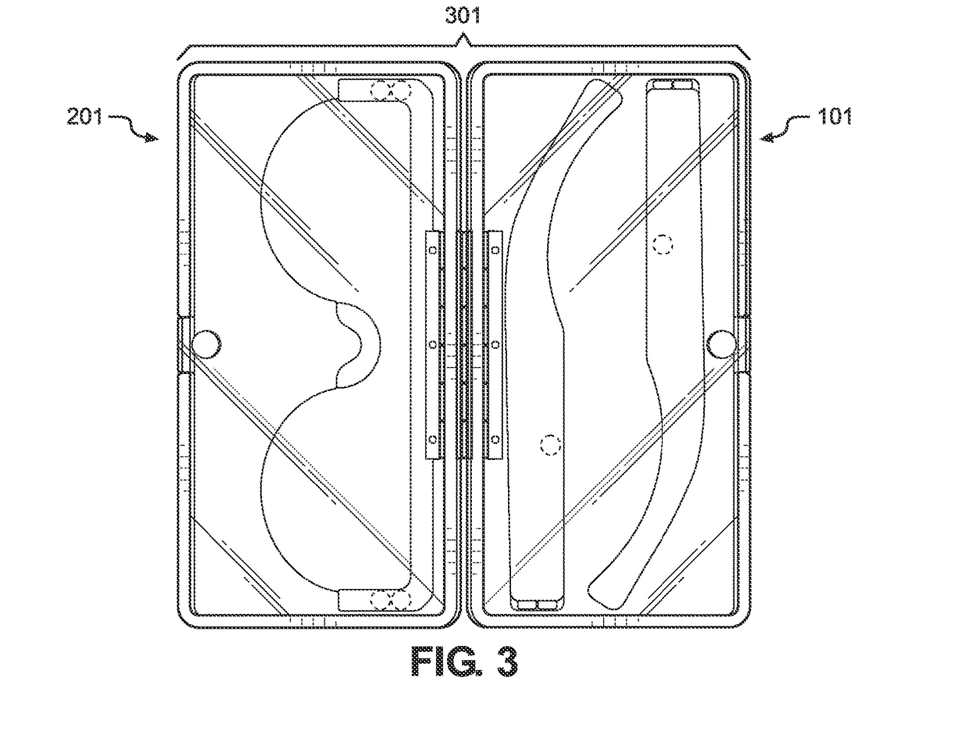
FIG. 3 is a perspective view of a first and second half of the cellphone assembly according to an embodiment of the invention.

FIG. 3 illustrates the apparatus 100 with the first half 101 and second half 201 splayed in an open position 301 centrally and rotatably attached via the main hinge 106. In some embodiments, the first half 101 and second half 201 may be removably attached to one another via the main hinge 106. Furthermore, in some embodiments the main hinge 106 may rotate in a manner whereby the glasses body storage 202 and the arm storage 102 comprise the interior of the apparatus 100 when in a closed position. Likewise, in some embodiments the main hinge 106 may rotate in a manner whereby the glasses body storage 202 and the arm storage 102 comprise the exterior of the apparatus 100 when in a closed position. As a result, in some embodiments modular glasses may be stored on an exterior of the apparatus 100 and in other embodiments modular glasses may be stored in an interior of the apparatus 100.

Figure 4:
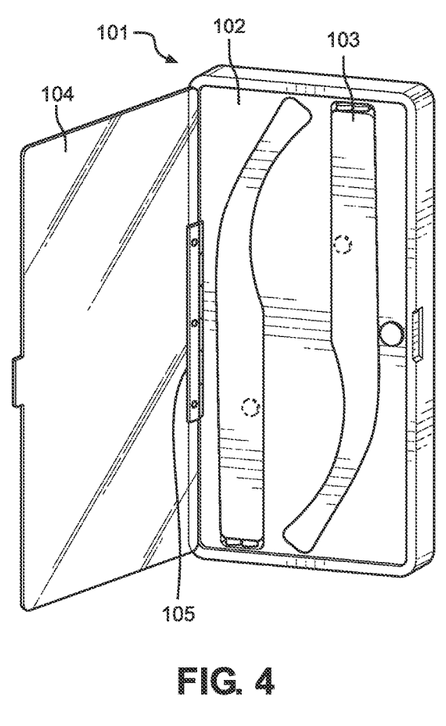
FIG. 4 is a perspective view of the first half of the cellphone assembly with opened outer casing according to an embodiment of the invention.
Figure 5:
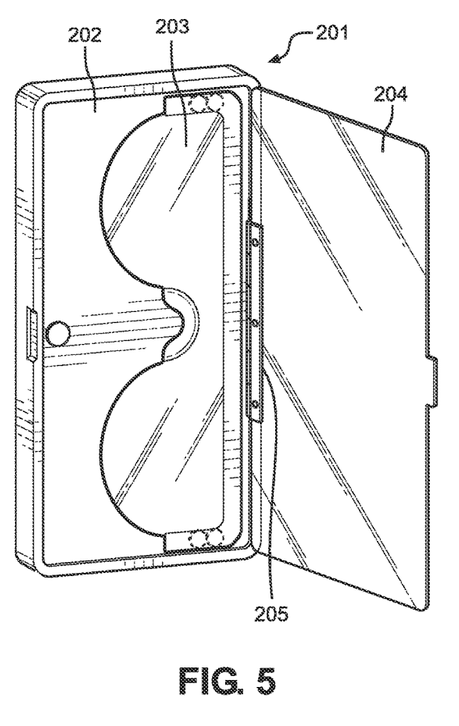
FIG. 5 is a perspective view of the second half of the cellphone assembly with opened outer casing according to an embodiment of the invention.

FIGS. 4 and 5 illustrate the apparatus 100 with the outer casings 104, 204 rotated along their respective first and second cover hinges 105, 205 in an opened position thereby exposing the glasses arms 102 with arm storage 102 of the first half 101 and the glasses body 203 with body storage 202 of the second half 201.

Figure 6:
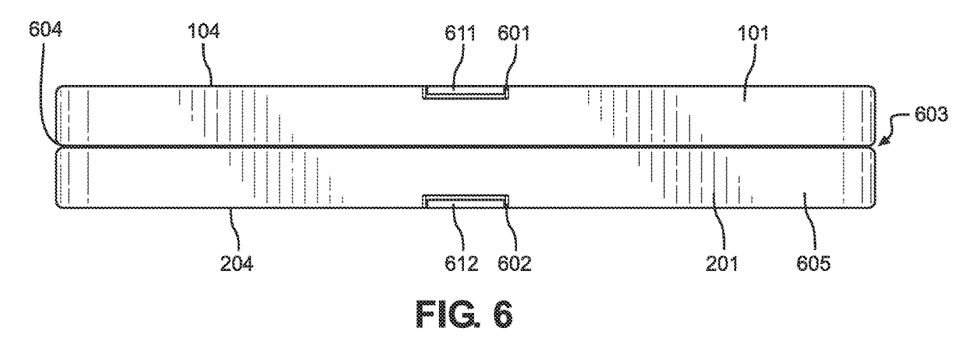
FIG. 6 is a side view of the cellphone assembly according to an embodiment of the invention.

FIG. 6 illustrates the apparatus 100 in a closed position 600 whereby the outer casings 104, 204 are on the exterior and a bifurcated medial section 604 of the apparatus side 605 exposes the positioning of the apparatus interior 603. As shown, the outer casings 104, 204 may include respective first and second casing tabs 611, 612 within a respective first half notch 601 and a second half notch 602. Both the notches 601, 602 and the tabs 611, 612 may facilitate a user's ability to open and keep closed their respective outer casings 104, 204. In some embodiments, the tabs 611, 612 and notches 601, 602 may form a friction fit or a snap fit whereby the outer casings 104, 204 may remain closed unless an amount of force necessary to overcome the fitting is exerted upon one or both of the tabs 611, 612 in the closed position.

Figure 7:
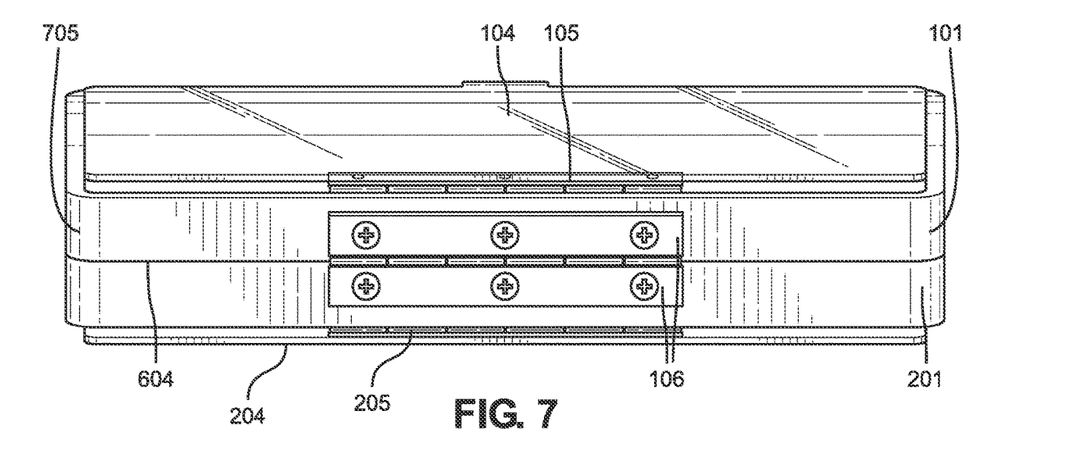
FIG. 7 is a side view of the cellphone assembly according to an embodiment of the invention.

FIG. 7 illustrates the apparatus 100 in a closed position 600 whereby the outer casings 104, 204 are on the exterior and the bifurcated medial section 604 of an apparatus side 705 shows a closer look at the main hinge 106 rotatably attached to both the first half 101 and second half 201. Also shown is the first cover hinge 105 of the outer casing 104 of the first half 101 and second cover hinge 205 of the outer casing 204 of the second half 201.

Figure 8:
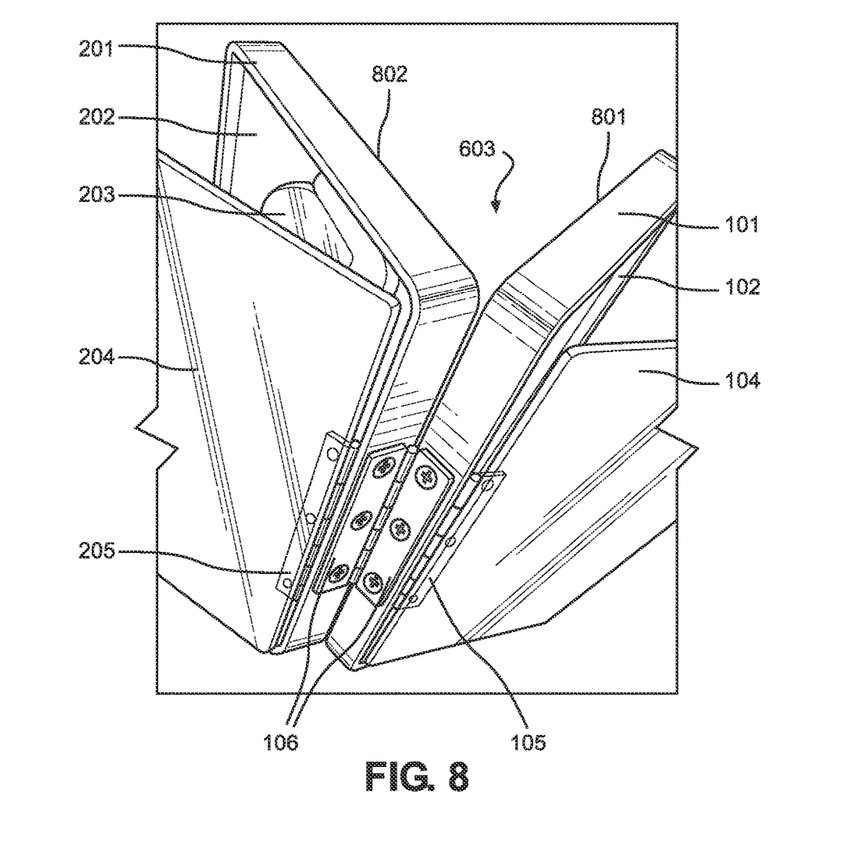
FIG. 8 is a perspective view of the cellphone assembly with opened outer casings and opened first and second halves according to an embodiment of the invention.

FIG. 8 illustrates the apparatus 100 rotated along the main hinge 106 orienting it in an open position 301 and revealing its interior 603. Further shown are the outer casings 104, 204 rotated along their respective first and second cover hinges 105, 205 and splayed in an open position. As such, the main hinge 106 when rotated open reveals a first interior surface 801 of the first half 101 and a second interior surface 802 of the second half 201 of the apparatus 100. Furthermore, the first and second cover hinges 105, 205 when rotated open reveal the glasses body storage 202 and glasses arm storage 102.

Figure 9:
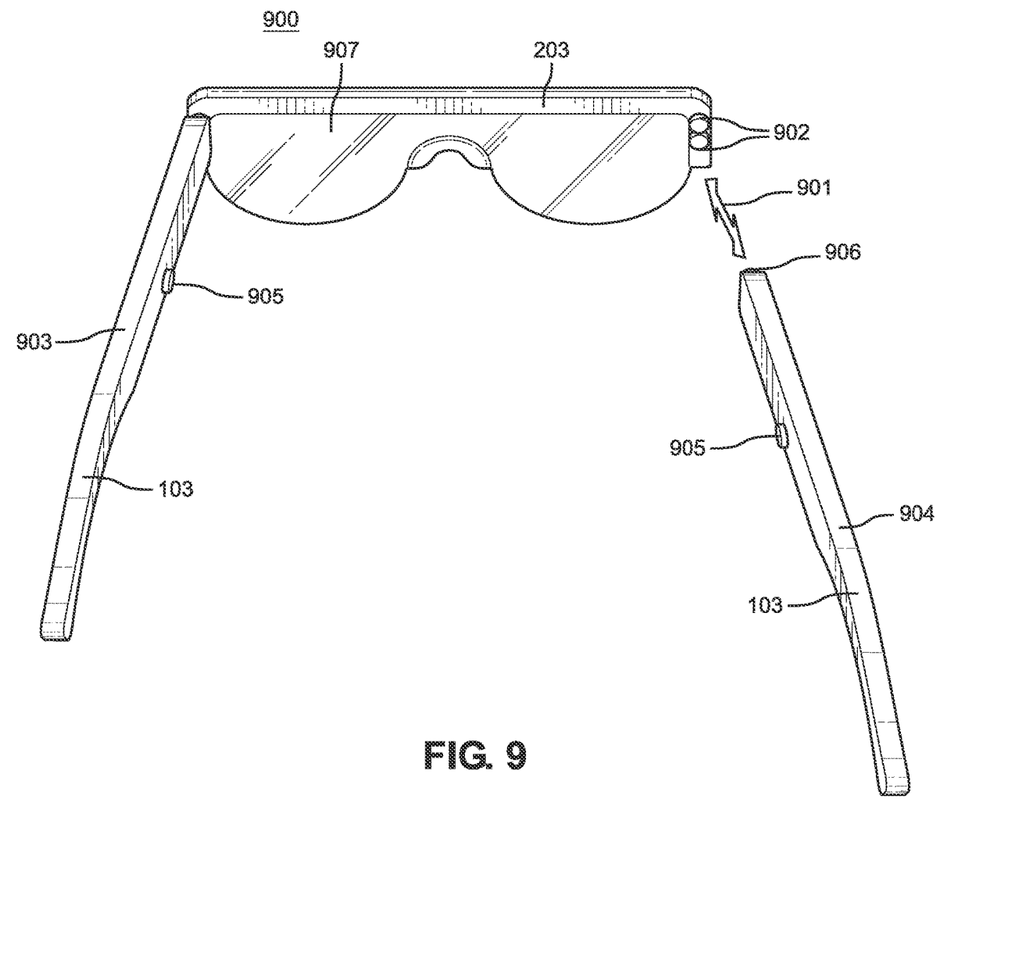
FIG. 9 is a perspective view of modular smart glasses withing the cellphone assembly according to an embodiment of the invention.

FIG. 9 illustrates the modular glasses 900 that may be used with the assembly 100. In some embodiments, the modular glasses 900 may be smart-glasses capable of displaying information within the glasses body 203. The glasses body 203 may include a plurality of body attractors 902 at opposing longitudinal ends of its interior surface 907. Likewise, the glasses arms 103 may removably engage the glasses body 203 via a plurality of end attractors 906 located at one end of each respective arm 103. As shown, one of the arms is removed 904 and one attached 903.

In some embodiments, the body attractors 902 and end attractors 906 may be oppositely charged magnets with strong enough attraction to keep the modular glasses 900 engaged while a user wears them. However, a user may disassemble the modular glasses 900 by overcoming the magnetic attracting force thereby detaching the arms 103 from the glasses body 203 for storage within the apparatus 100. Also shown are medial arm attractors 905, which may facilitate the arms 103 remaining secured within the apparatus 100 when stored.

Figure 10:
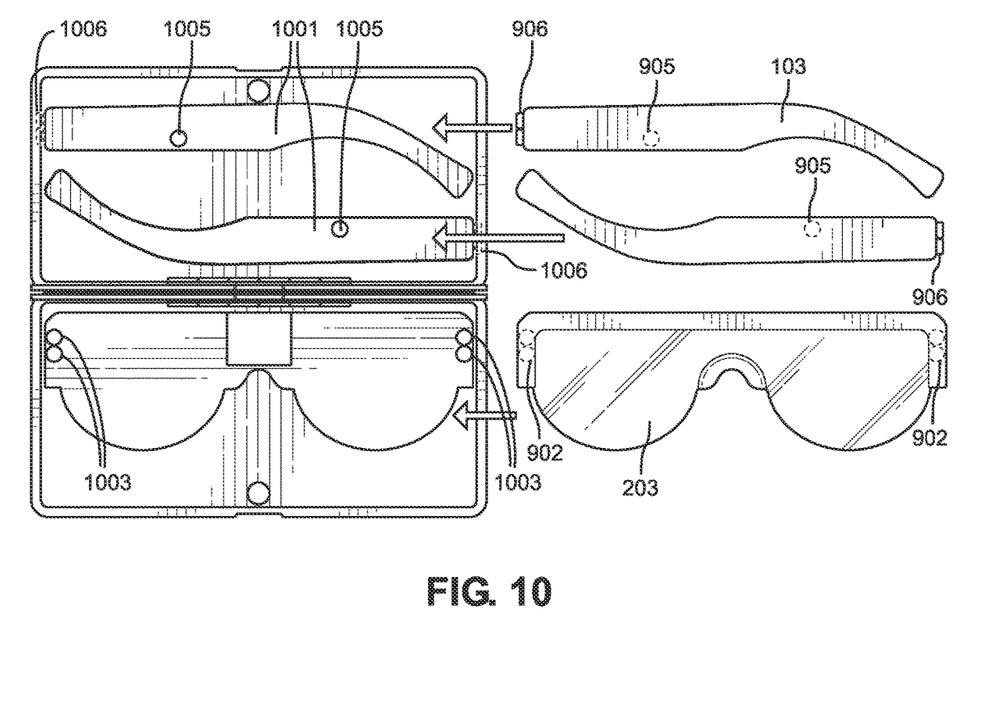
FIG. 10 is a diagrammatic view of modular smart glasses fitting within the cellphone assembly according to an embodiment of the invention

FIG. 10 illustrates how the modular glasses 900 may be secured into the first and second halves 101, 102. As shown, the first half 101 may include a pair of arm impressions 1001 which may be negative copies of the arms 103 congruently shaped and indented into the first half 101 to snuggly fit the arms 103 therein. Likewise, the second half 101 may include a body impression 1002, which may be a negative copy of the glasses body 203 congruently shaped and indented into the second half 201 to snuggly fit the glasses body 203 therein.

The arm impressions 1001 may include storage medial attractors 1005 within a medial portion therein that correspond to the medial arm attractors 905. The storage medial attractors 1005 and arm attractors 905 may be oppositely charged magnets structured to removably engage each other via magnetic force. Likewise, there may be side attractors 1006 along the interior side of the apparatus proximate respective ends of the arm impressions 1001 that may correspond with the end attractors 906 of the arms 103. The side attractors 1006 and end attractors 906 may be oppositely charged magnets structured to removably engage each other via magnetic attraction.

Likewise, the body impression 1002 may include body attractors 1003 at opposing longitudinal ends of the body impression 1002 corresponding to the positioning of the body attractors 902 of the glasses body 201. The body attractors 902 of the body 201 and body impression attractors 1003 may be oppositely charged magnets structured to removably engage each other via magnetic force.

Figure 11:
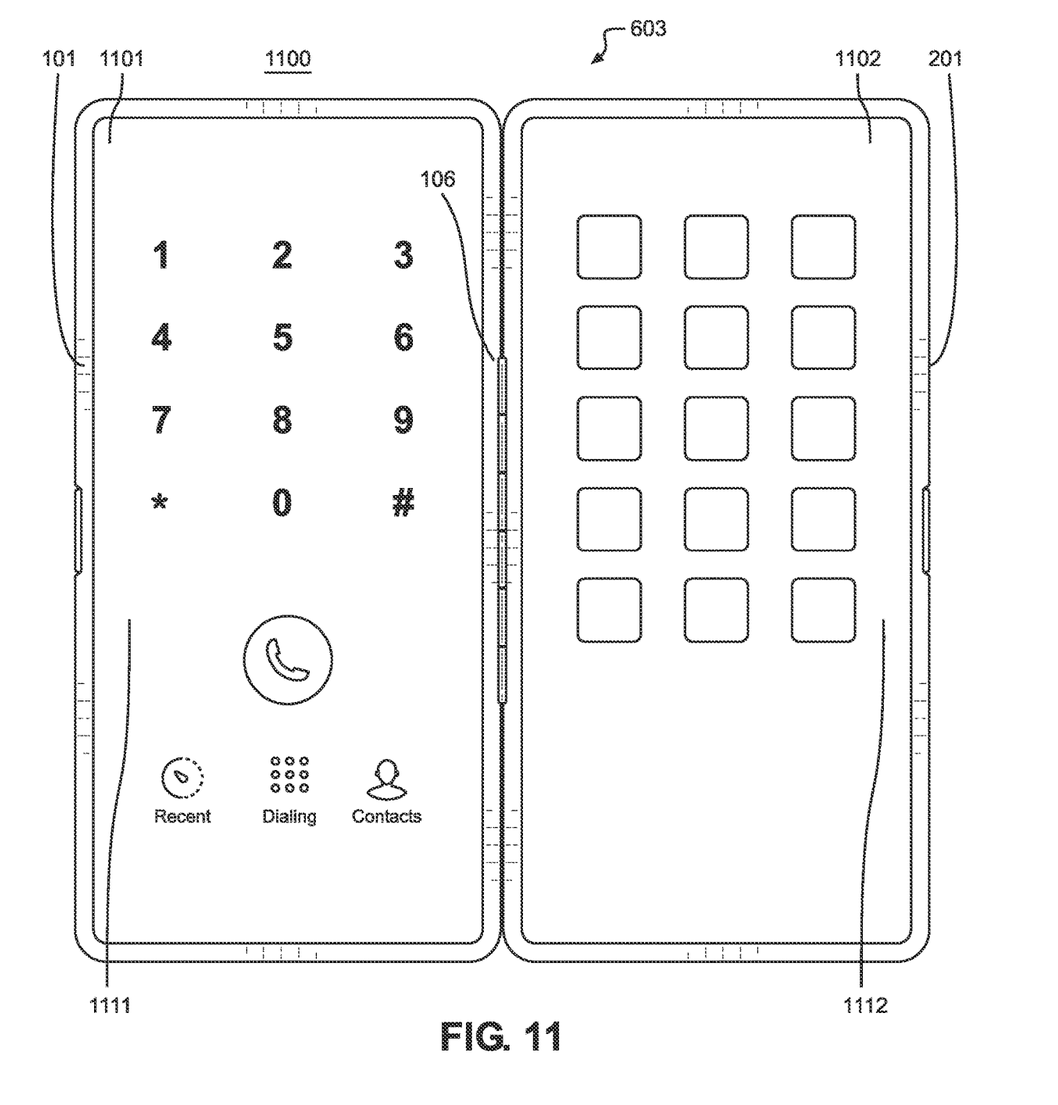
FIG. 11 is view of a dual screened cellphone within the cellphone assembly according to an embodiment of the invention.

FIG. 11 illustrates that in one embodiment the apparatus interior 603 may be a dual screened cellphone 1100. A first display 1111 may be embedded into the first half 101 and first interior 1101 and a second display 1112 may be embedded into the second half 102 and second interior 1102. However, as previously mentioned, in some embodiments, the main hinge 106 may rotate in a manner orienting the outer casings 104, 105 as the interior when closed. In this embodiment, the dual screened cellphone 1100 would comprise the exterior of the apparatus 100.

Figure 12:
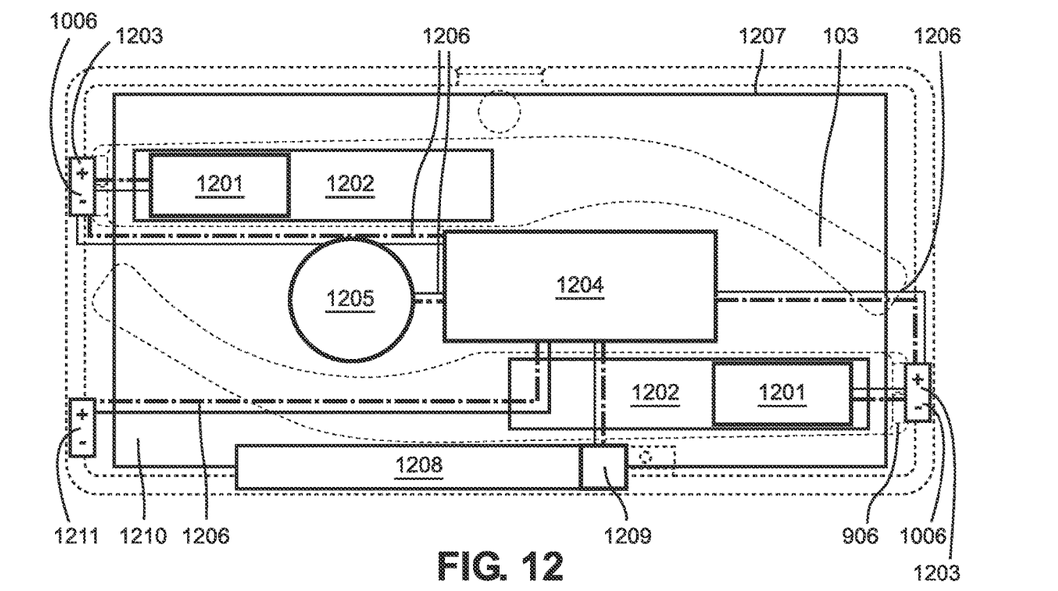
FIG. 12 is an interior view of componentry within the cellphone assembly according to an embodiment of the invention.

FIG. 12 illustrates some of the internal electrical componentry of the apparatus 100. As shown and described herein, the apparatus 100 may include modular glasses 900 whereby the glasses arms 103 may be removably stored within the first half 101. As further described, the modular glasses 900 may be smart-glasses capable of pairing with a smart-phone 1100 for data transfer. As such, the glasses arms 103 may include arm batteries 1201 and arm circuit boards 1202 to facilitate their functionality.

In some embodiments, the side attractors 1006 within the arm storage 102 may double as charging and data transfer ports 1203 able to relay charge to the glasses arms 103 and data to and from the smart-phone 1100. In some embodiments, the arms 103 may accept the charge and data through the arm end attractors 906. In other words, the end attractors 906 and, as will be described, body attractors 1003 may include data ports structured to exchange data between at least one of the glasses arms 103, glasses body 203, dual screened cellphone 900 and the first half 101 and second half 201.

The apparatus 100 itself may receive charge by at least one of two means. It may include a USB port 1211 for wired charging to an electrically coupled first half phone case battery 1204. In some instances, the USB port 1211 may be used for data transfer as well. The apparatus 100 may also include a wireless charging receiver 1205 electrically connected to the first half phone case battery 1204 structured to feed charge thereto. The wireless charging receiver 1205 and USB port 1211 may be structured to provide a means to recharge at least one of the glasses arms 103, glasses body 203, first half 101, second half 201, and smart-phone 1100. Furthermore, the first half phone case battery 1204 may include battery circuitry 1206 extending to the glasses arms 103 capable of charging the arm batteries 1201. The first half 101 may also include a data bus 1207 electrically coupled to the glasses arms 103, the first half itself 101, and in some embodiments the smart-phone 1100.

The first half 101 may additionally include at least a portion of a load sharing battery 1209 operable to share charge with the second half 201. In some embodiments, the load sharing battery 1209 may be a single battery shared by both the first and second halves 101, 201. In other embodiments, the load sharing battery 1209 may be two batteries bifurcated by the first and second halves 201. Additionally, the first half 101 may include a shared data bus 1208 whereby data may be shared with the second half 201, the glasses body 203, and the smart-phone 1100.

Figure 13:
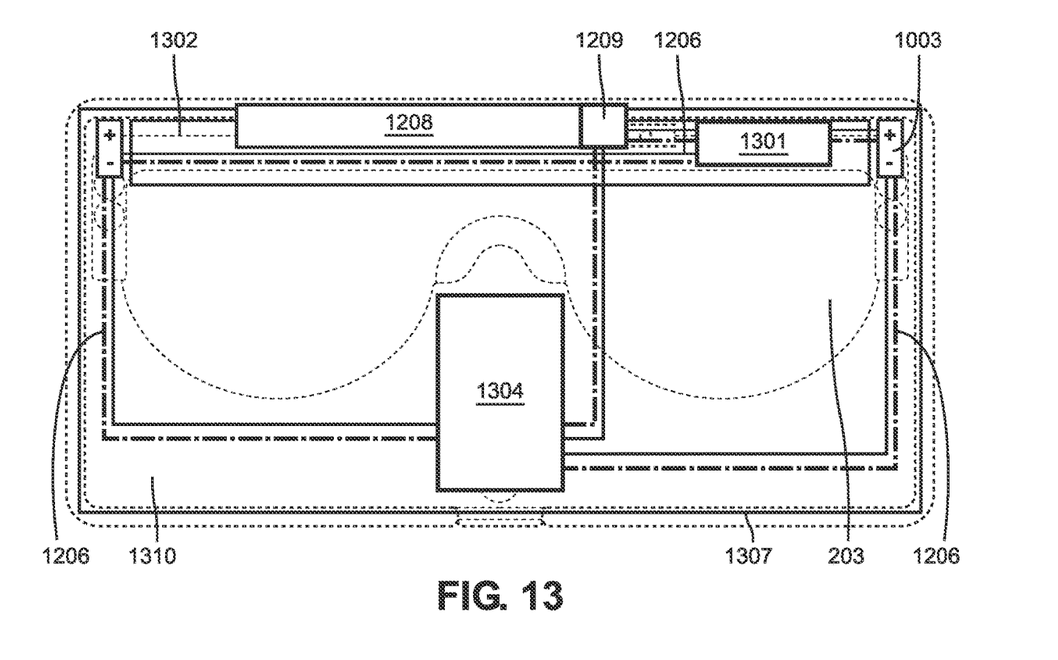
FIG. 13 is an interior view of componentry within the cellphone assembly according to an embodiment of the invention.

FIG. 13 illustrates additional internal electrical componentry within the second half 201. As previously described, the glasses body 203 may be removably stored within the second half 201. Similar to the glasses arms 103, the glasses body 203 may include a body battery 1301 and body circuit board 1302 to facilitate its functionality. In some embodiments, the body battery 1301 may be within an upper longitudinal segment of the body frame. Similar to the arms 103, in some embodiments the body attractors 1003 within the body storage 202 may double as charging and data transfer ports able to relay charge to the glasses body 203 and data to and from the smart-phone 1100.

Similar to the first half 101, the second half 201 may include a load sharing battery 1209. The load sharing battery 1209 may be two batteries bifurcated by the first and second halves 201. Additionally, the second half 201 may include a shared data bus 1208 whereby data may be shared with the first half 101, the second half 201, the glasses body 203, and the smart-phone 1100. The second half 201 may also include its own data bus 1307 capable of transferring data to those entities as well.

The body storage itself 202 may also include its own battery 1304 that may be coupled to both the load sharing battery 1209 and the body attractor charging ports 1003. Furthermore, it should be noted that the second half phone case battery 1304 and the first half phone case battery 1204, and in some embodiments the load sharing battery 1209, may be electrically coupled to the smart-phone 1100 in order to feed it charge. As previously described, this may be a dual screened cellphone oriented on the opposing side or surface of the first half and second half storage 102, 202.

Figure 14:
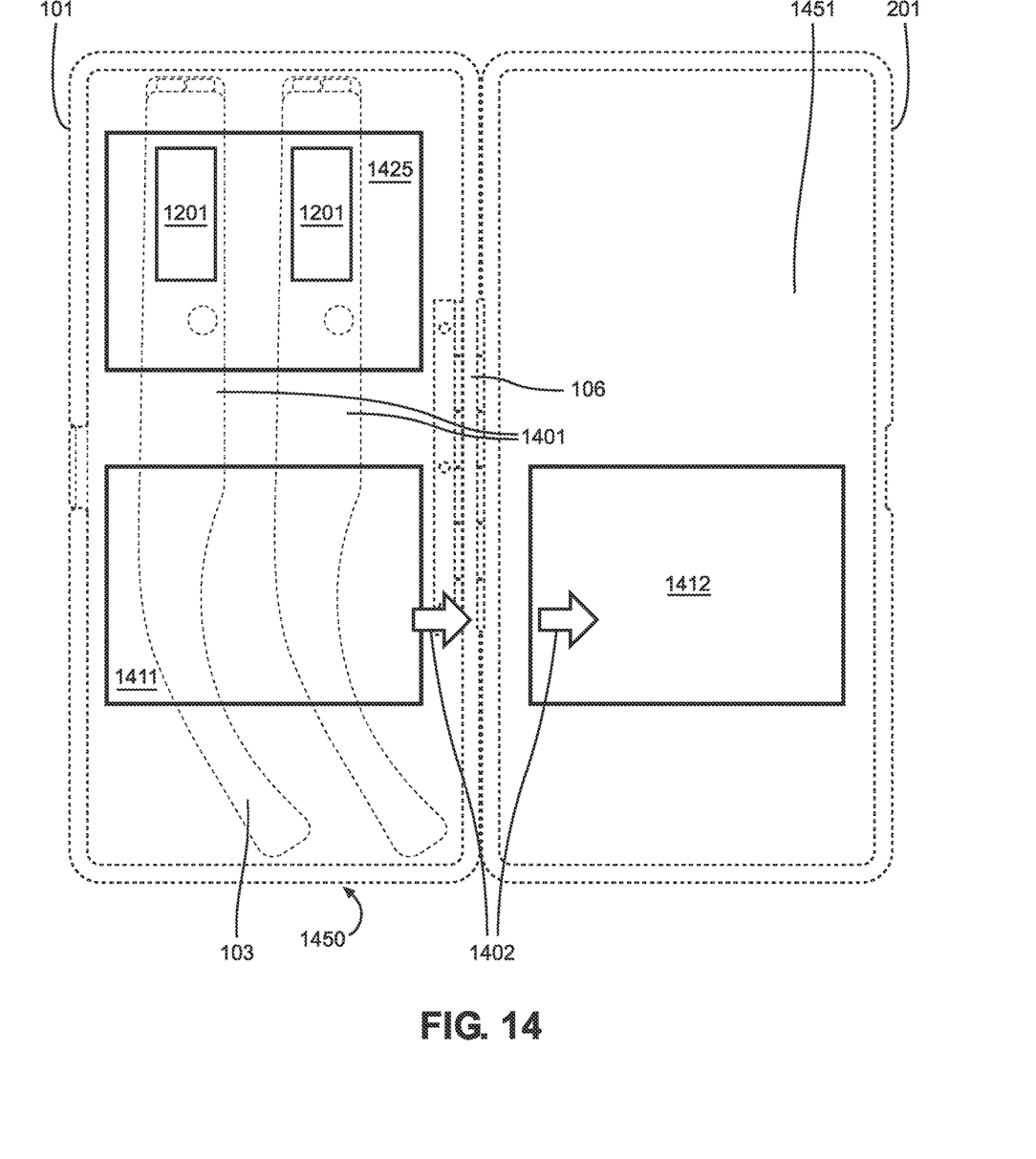
FIG. 14 is an interior view of componentry within the cellphone assembly according to another embodiment of the invention

FIG. 14 illustrates another embodiment of the apparatus 100 whereby the glasses arms 103 are oriented in a parallel positioning 1401 within the first half 101. An upper first half battery 1425 may be located at the base end of the glasses arms 103 to assist with charging the glasses arm batteries 1201. In some embodiments, the first half may also include a lower first half battery 1411 capable of wirelessly power sharing with an adjacent second half battery 1412 within the second half 201. When the first half 101 is folded over on the second half 201, the batteries 1411, 1412 may share charge.

In some embodiments, the first half 101 may include the glasses arms 103 on one side and the glasses body 203 on an opposing side 1450. In this embodiment, the smart-phone 1100 would solely be included within the second half 201. Furthermore, the main hinge 106 may be detachable allowing for the smart-phone 1100 to separate from the storage of the modular glasses 900 permitting a user to carry them together or separately when desired.

That which is claimed is:

1. A cellphone assembly comprising
   a first half comprising
      a glasses arm storage compartment, and
      a rotatable outer casing,
   a second half comprising
      a glasses body storage compartment, and
      a rotatable outer casing,
   modular glasses comprising
      detachable glasses arms, and
      a detachable glasses body,
   a dual screened cellular phone positioned on an opposing side of the glasses arm storage compartment and the glasses body storage compartment;
   wherein the first half and second half outer casings are rotatable along a respective first cover hinge and second cover hinge;
   wherein the first half and the second half are rotatably engaged along a main hinge;
   wherein the modular glasses are configured to removably assemble via end attractors on the glasses arms removably engaging to body attractors on the glasses body; and
   wherein the end attractors and the body attractors further include data ports configured to exchange data between at least one of the glasses arms, glasses body, dual screened cellphone and the first half and second half.

2. The cellphone assembly of claim 1 wherein the modular glasses are smart glasses configured to be rechargeable by the first and second half.

3. The cellphone assembly of claim 1 wherein the modular glasses are stored on an exterior of the assembly and the dual screened cellphone comprises the interior of the assembly.

4. The cellphone assembly of claim 1 wherein the modular glasses are stored on an interior of the assembly and the dual screened cellphone comprises the exterior of the assembly.

5. The cellphone assembly of claim 1 wherein the glasses arms and glasses body are removably secured within their respective first and second halves via respective glasses arm impressions and glasses body impression.

6. The cellphone assembly of claim 1 wherein the glasses arms and glasses body are further secured to the first and second halves via magnets positioned within the respective glasses arm impressions and glasses body impression.

7. The cellphone assembly of claim 1 wherein the first half further comprises a wireless charging receiver configured to charge a first battery within the first half.

8. A cellphone assembly comprising
   a first half comprising
      a glasses arm storage compartment including
         separate glasses arm impressions comprising medial attractors, and
      a rotatable outer casing,
   a second half comprising
      a glasses body storage compartment including
         a separate glasses body impression comprising body attractors, and
      a rotatable outer casing,
   modular glasses comprising
      detachable glasses arms including end attractors, and
      a detachable glasses body including body attractors,
   a dual screened cellular phone positioned on an opposing side of the glasses arm storage compartment and the glasses body storage compartment;
   wherein the detachable glasses arms are configured to removably engage the glasses body via the end attractors engaging the body attractors;
   wherein the detachable glasses arms are configured to removably engage the glasses arm impressions via the medial attractors;
   wherein the detachable glasses body is configured to removably engage the glasses body impression via body attractors positioned on the glasses body connecting to body attractors positioned within the glasses body impression;

wherein at least one of the medial attractor, body attractor, and end attractors further include a data port and charging port configured to exchange at least one of data and charge between at least one of the glasses arms, glasses body, dual screened cellphone and the first half and second half;

wherein the first half and second half outer casings are rotatable along a respective first cover hinge and second cover hinge; and wherein the first half and the second half are rotatably engaged along a main hinge.

9. The cellphone assembly of claim 8 wherein the modular glasses are smart glasses comprising batteries within at least one of the glasses arm and glasses body that are configured to be rechargeable by the first and second half.

10. The cellphone assembly of claim 9 further including at least one of wireless receiver and USB port configured to provide a means to recharge at least one of the glasses arms, glasses body, first half, second half, and dual screened cellular phone.

11. The cellphone assembly of claim 8 further including at least one data bus within the first half and second half configured to relay data between at least one of the glasses arms, glasses body, dual screened cellular phone, the first half and second half.

12. The cellphone assembly of claim 8 wherein the modular glasses are stored on an exterior of the assembly and the dual screened cellphone comprises the interior of the assembly.

13. The cellphone assembly of claim 8 wherein the modular glasses are stored on an interior of the assembly and the dual screened cellphone comprises the exterior of the assembly.

14. A cellphone assembly comprising
a first half comprising
a glasses arm storage compartment including
separate glasses arm impressions comprising medial attractors,
a first half battery,
a wireless charging receiver connected to the first half battery,
case end attractors,
a circuit board,
a data bus,
a USB port, and
a load sharing battery;
a rotatable outer casing,
a second half comprising
a glasses body storage compartment including
a separate glasses body impression comprising body attractors,
a second half battery,
a load sharing battery,
a data bus,
a circuit board,
a rotatable outer casing,
modular glasses comprising
detachable glasses arms including end attractors comprising
a respective arm battery within each glasses arm
a respective arm circuit board within each glasses arm, and
a detachable glasses body including body attractors comprising
a glasses body battery within an upper longitudinal segment of the body frame
a glasses body circuit board within an upper longitudinal segment of the body frame,
a dual screened cellular phone positioned on an opposing side of the glasses arm storage compartment and the glasses body storage compartment;
wherein the detachable glasses arms are configured to removably engage the glasses body via the end attractors engaging the body attractors;
wherein the detachable glasses arms are configured to removably engage the glasses arm impressions via the medial attractors;
wherein the detachable glasses body is configured to removably engage the glasses body impression via body attractors positioned on the glasses body connecting to body attractors positioned within the glasses body impression;
wherein at least one of the medial attractor, body attractor, and end attractors further include a data port and charging port configured to exchange at least one of data and charge between at least one of the glasses arms, glasses body, dual screened cellphone and the first half and second half;
wherein the first half and second half outer casings are rotatable along a respective first cover hinge and second cover hinge; and
wherein the first half and the second half are rotatably engaged along a main hinge.

15. The cellphone assembly of claim 14 wherein the first half battery is configured to supplement charge to the glasses arms.

16. The cellphone assembly of claim 14 wherein the second half battery is configured to supplement charge to the glasses body.

17. The cellphone assembly of claim 14 wherein the first half battery, second half battery, and load sharing battery are configured to supply charge to at least one of the glasses arms, glasses body, and dual screened cellular phone.

* * * * *